United States Patent
Reinhart

(10) Patent No.: US 8,920,064 B2
(45) Date of Patent: Dec. 30, 2014

(54) SHAFT ASSEMBLY WITH INVERTED CHAMFERS ON SPLINES

(75) Inventor: Timothy J. Reinhart, McCordsville, IN (US)

(73) Assignee: GM Global Technology Operations, LLC, Detroit, MI (US)

( * ) Notice: Subject to any disclaimer, the term of this patent is extended or adjusted under 35 U.S.C. 154(b) by 214 days.

(21) Appl. No.: 13/345,151

(22) Filed: Jan. 6, 2012

(65) Prior Publication Data

US 2013/0174398 A1 Jul. 11, 2013

(51) Int. Cl.
*F16D 1/10* (2006.01)

(52) U.S. Cl.
USPC .................................... 403/359.6; 403/359.1

(58) Field of Classification Search
CPC ............ F16D 1/101; F16D 1/10; F16D 1/06; F16D 2001/103; F16C 2226/80
USPC .................................... 403/364, 359.1–359.6
See application file for complete search history.

(56) References Cited

U.S. PATENT DOCUMENTS

| | | | |
|---|---|---|---|
| 3,529,440 A * | 9/1970 | Bauer | 464/73 |
| 4,640,294 A | 2/1987 | Ordo | |
| 4,727,770 A | 3/1988 | Ordo | |
| 6,348,001 B2 * | 2/2002 | Killop | 464/179 |
| 6,896,442 B1 * | 5/2005 | Howie, Jr. | 403/359.1 |
| 8,353,775 B2 * | 1/2013 | Kamikawa et al. | 464/7 |
| 2006/0268081 A1 * | 11/2006 | Sugata | 347/86 |
| 2011/0219894 A1 * | 9/2011 | Mencher et al. | 74/411 |

FOREIGN PATENT DOCUMENTS

DE   102009047519 A1 *   6/2011

* cited by examiner

*Primary Examiner* — Joshua Kennedy

(57) ABSTRACT

A shaft assembly comprising a first shaft and a second shaft. The first shaft has a plurality of first splines that each have an end portion and a chamfer disposed on the end portion. The second shaft is coaxial with the first shaft and has a plurality of second splines. The plurality of second splines each have a base portion and an end portion. The end portion defines an inverted chamfer having a base and a tip. The tip projects from the base radially away from the second shaft and axially away from the base portion of the plurality of second splines. The base of the inverted chamfer undercuts the tip of the inverted chamfer. The plurality of first splines engage with the plurality of second splines to couple the first shaft and the second shaft for common rotation.

8 Claims, 3 Drawing Sheets

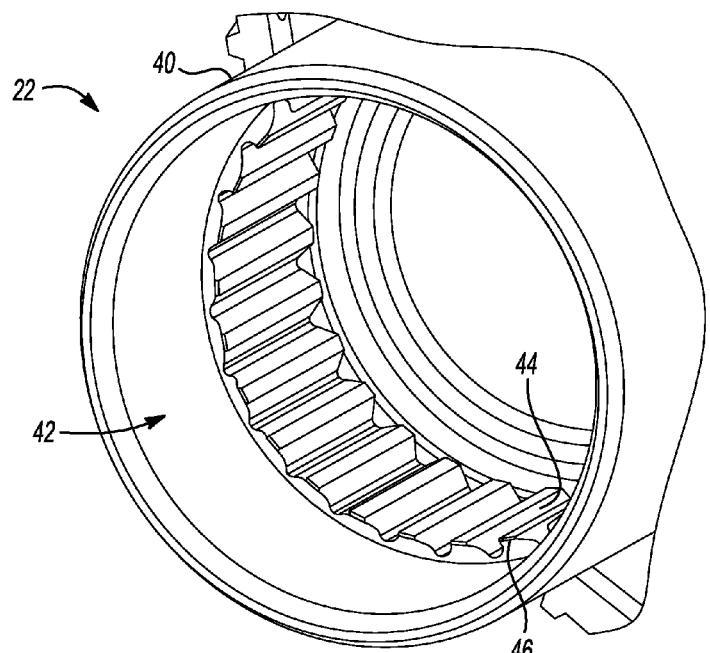
Fig-3
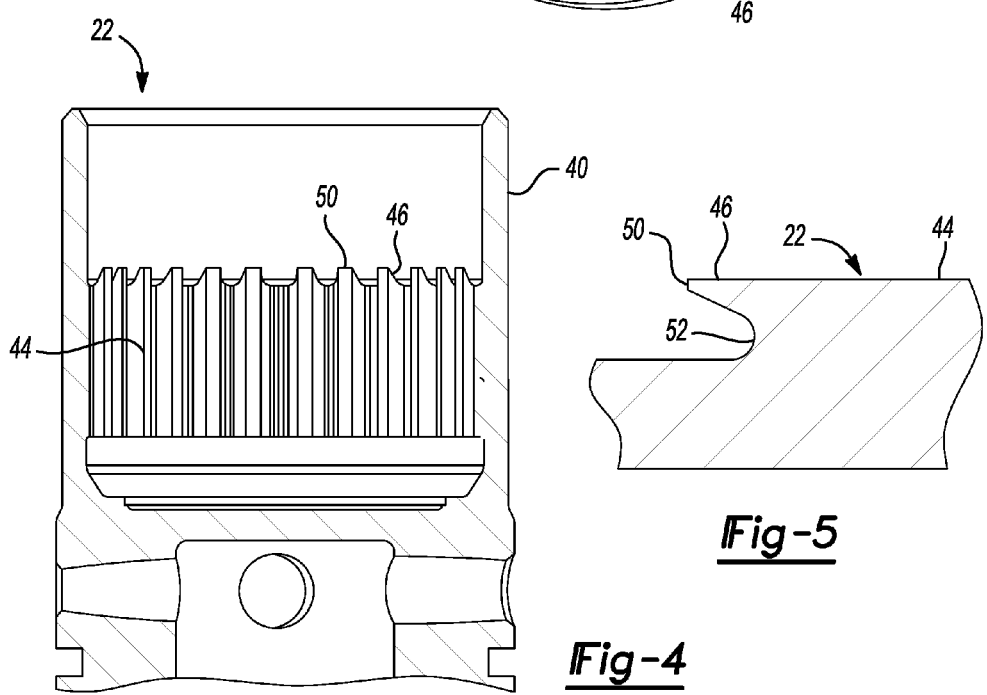
Fig-4
Fig-5

SHAFT ASSEMBLY WITH INVERTED CHAMFERS ON SPLINES

FIELD

The present disclosure relates to internal splines on a transmission shaft. More specifically, the present disclosure relates to internal transmission input shaft splines having an inverted chamfer.

BACKGROUND

The statements in this section merely provide background information related to the present disclosure and may not constitute prior art.

A typical motor vehicle automatic transmission includes gear elements and multiplate clutches that are selectably engageable to establish one of several forward speed ratios between the transmission input and output shafts. The various rotatable shafts in the transmission may be rotatably coupled by cooperating splines on the components to be coupled. These component parts are often assembled by sliding one of the components over or into the other component so that the splines on each component engage with the splines on the other component. Traditional chamfers may be employed on one or both of the components to promote a coaxial alignment of the components.

Although the chamfers promote coaxial alignment of the components, the splines of the components are often rotationally misaligned in a condition known as "tooth butt." In a tooth butt condition the splines of one component are not disposed in the grooves of the other component, but rather the splines of each component are at least partially rotationally aligned to resist axial translation of the components. Additionally, when in a tooth butt condition the contact interface between the components results in frictional resistance to rotation. Such frictional resistance must be overcome to rotate the components into rotational alignment. Existing solutions are often costly or complex.

Accordingly, there is a need in the art for a spline that promotes coaxial alignment of components, has improved tooth butt characteristics, and is cost effective.

SUMMARY

The present invention provides a shaft assembly comprising a first shaft and a second shaft. The first shaft has a plurality of first splines that each have an end portion and a chamfer disposed on the end portion. The second shaft is coaxial with the first shaft and has a plurality of second splines. The plurality of second splines each have a base portion and an end portion. The end portion defines an inverted chamfer having a base and a tip. The tip of the inverted chamfer projects from the base of the inverted chamfer radially away from the second shaft and axially away from the base portion of the plurality of second splines. The base of the inverted chamfer undercuts the tip of the inverted chamfer. The plurality of first splines engage with the plurality of second splines to couple the first shaft and the second shaft for common rotation.

In another aspect, the first shaft is coupled for rotation with an engine of a vehicle.

In yet another aspect, the first shaft is a damper hub of a damper of the vehicle.

In yet another aspect, the second shaft is a transmission input shaft.

In yet another aspect, the first shaft is an inner shaft and the plurality of first splines are a plurality of external splines.

In yet another aspect, the second shaft is a sleeve shaft that defines a central bore, and wherein the plurality of second splines are internal splines extending from the sleeve shaft into the central bore.

In yet another aspect, the base of the inverted chamfer is cross-sectionally semicircular in shape.

In yet another aspect, the plurality of second splines have a cross sectional shape that is substantially an isosceles trapezoid having a base portion at the second shaft and a tip portion radially away from the second shaft.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, like reference characters designate corresponding parts throughout the different views. In the drawings:

FIG. 3 is an isometric view of a transmission input shaft in accordance with principles of the present invention;

FIG. 4 is a side cross sectional view of a transmission input shaft in accordance with the principles of the present invention;

FIG. 5 is a side cross sectional view of a portion of a transmission input shaft in a accordance with the principles of the present invention.

DETAILED DESCRIPTION

The following description is merely exemplary in nature and is not intended to limit the present disclosure, application, or uses.

Figure 1:
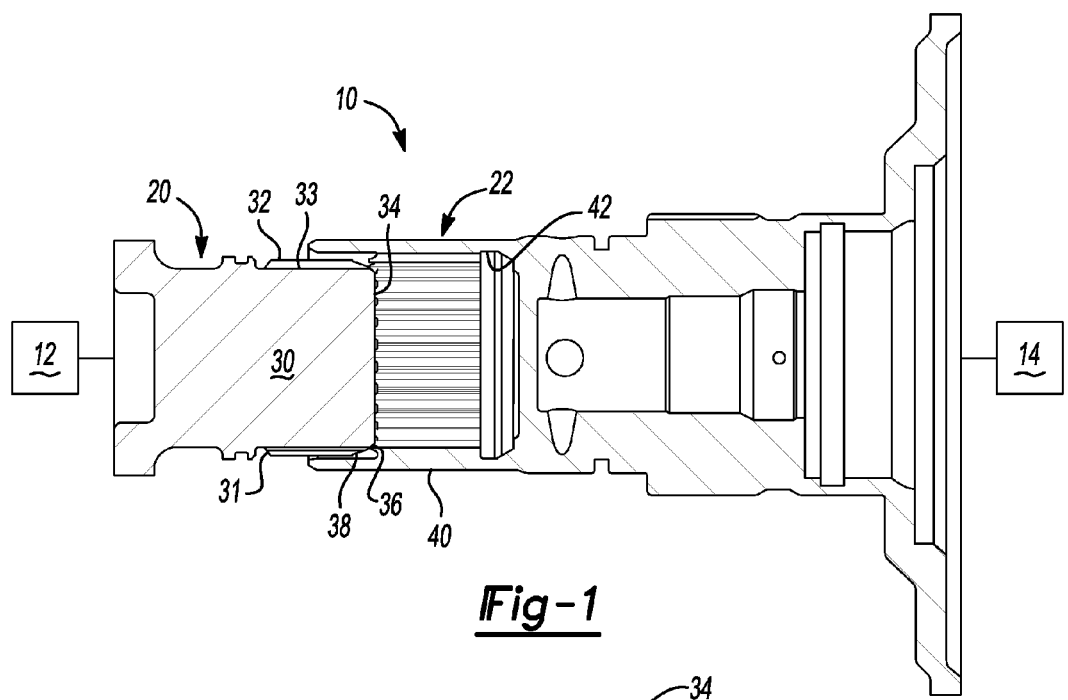
FIG. 1 is a cross section view of a transmission shaft assembly in accordance with principles of the present invention.

Referring now to FIG. 1, a transmission shaft assembly embodying the principles of the present invention is illustrated and designated as reference number 10. In the example provided, the transmission shaft assembly 10 is disposed between an engine 12 and a transmission 14 of a vehicle. The transmission shaft assembly 10 includes an inner shaft or first shaft 20 and an outer shaft or sleeve shaft 22. For example, the first shaft 20 is a damper hub of a damper connected for rotation with a crank of the engine 12. The sleeve shaft 22 is an input shaft of the transmission 14.

Figure 2A:
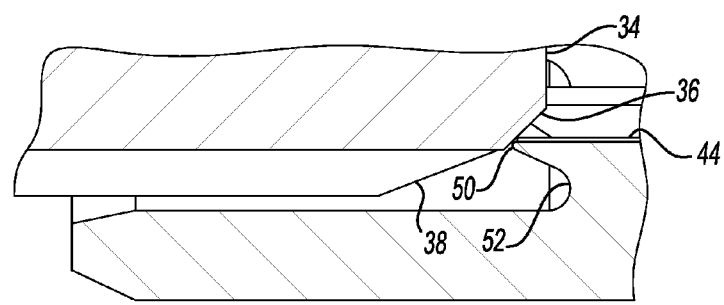
FIG. 2a is a cross section view of a portion of the transmission shaft assembly of FIG. 1.
Figure 2B:
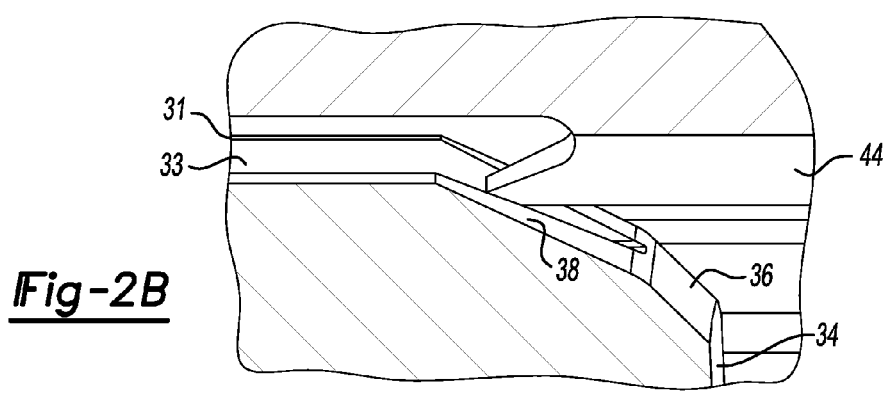
FIG. 2b is a cross section view of a portion of the transmission shaft assembly of FIG. 1.

Referring now to FIGS. 2A and 2B, and with continued reference to FIG. 1, a portion of the transmission shaft assembly 10 is illustrated in cutaway views. The first shaft 20 includes an end portion 30. The end portion 30 includes external splines 32 and an end surface 34. The external splines 32 are formed into the first shaft 20 as alternating projections 31 and grooves 33 for coupling the first shaft 20 with the sleeve shaft 22, as will be described below. Each of the external splines 32 has a first chamfer 36 and a second chamfer 38, as is most clearly seen in FIGS. 5A and 5B. The first chamfer 36 is substantially planar and extends from the end surface 34 towards an outer radius of the projections 31 and axially into the end portion 30 of the first shaft 20. The second chamfer 38 is substantially planar and extends from the first chamfer 26 to the outer radius of the projections 31 and axially into the end portion 30 of the first shaft 20. The first chamfer 36 is disposed at an angle with respect to the end surface 34 that is smaller than an angle of the second chamfer 38. In the example provided, each groove 33 ends and each projection 31 begins at an inner radial portion of the second chamfer 38. It should be appreciated that the chamfers on the first shaft 20 may be included in different numbers and be at different angles without departing from the scope of the present invention.

Referring now to FIGS. 3-5, and with continued reference to FIGS. 1, 2A, and 2B, the sleeve shaft 22 is shown in isometric and cross section views. The sleeve shaft 22 includes an end portion 40 that has a central bore 42. A plurality of internal splines 44 are formed on the end portion 40 and extend into the central bore 42. The internal splines 44 have a shape similar to an isosceles trapezoid with a base at the end portion 40 and a tip projecting radially inward into the central bore 42. The internal splines 44 complement the shape of the external splines 32 of the first shaft 20. Additionally, the internal splines 44 are circumferentially spaced to engage the external splines 32 and rotationally couple the sleeve shaft 22 with the first shaft 20.

Each of the internal splines 44 includes an inverted chamfer 46 at an end portion of the internal spline 44. The inverted chamfer 46 has a tip portion 50 and an undercut base portion 52. The tip portion 50 projects away from the spline 44 towards the first shaft 20 in an axial direction. The base portion 52 extends from the tip portion 50 in a radially outward direction and axially away from the first shaft 20. Accordingly, the tip portion 50 has a width and cross sectional area that is less than a width and cross sectional area of the base 52. In the example provided, the base portion 52 is a cross-sectionally semicircular groove that transitions to the end portion 40 and the tip portion 50 at surfaces that are tangent to the cross-sectionally semicircular groove.

Figure 6:
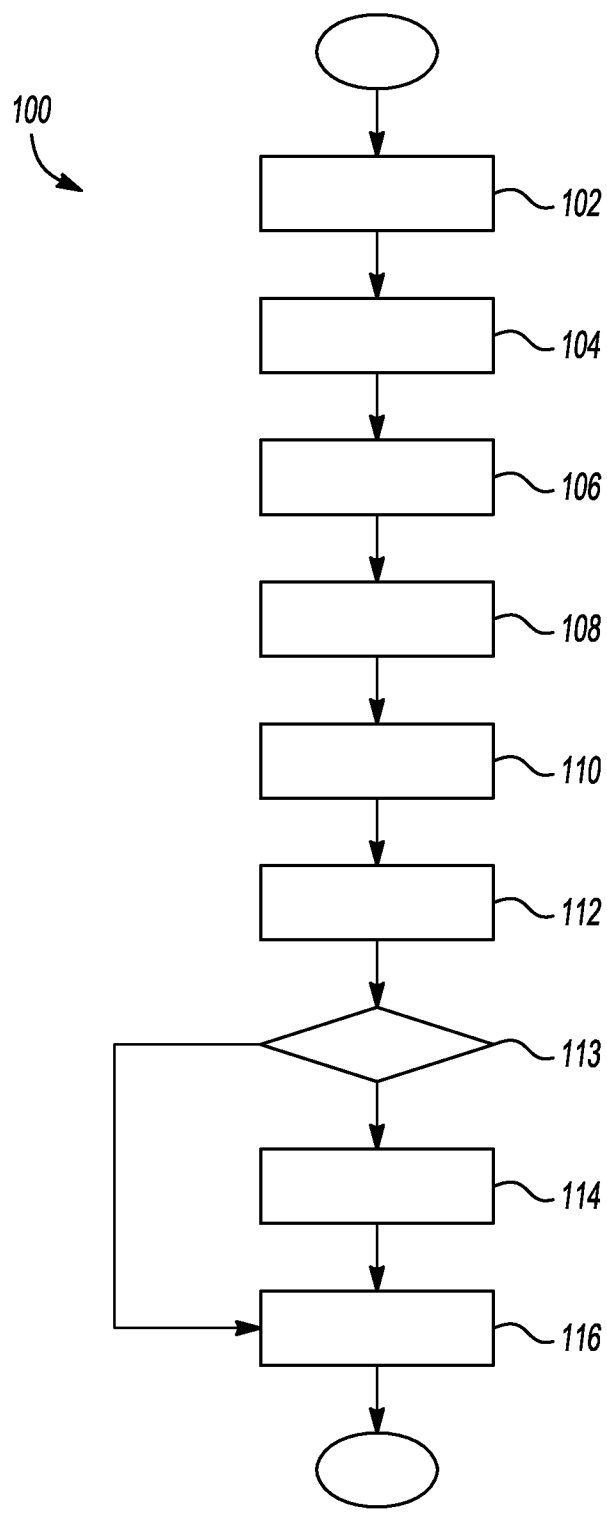
FIG. 6 is a flow chart illustrating a method of assembling a vehicle powertrain in accordance with principles of the present invention.

Referring now to FIG. 6, and with continued reference to FIGS. 1-5, a method of assembling a powertrain is illustrated in flow chart format and indicated by reference number 100. The method of assembling a powertrain is a blind assembly where the operator has reduced ability to see the rotational alignment of splines on shafts that are to be coupled. In step 102 an inner shaft or first shaft having external splines with chamfers is provided. In step 104 an outer shaft or sleeve shaft having a central bore is provided.

In step 106 an inverted chamfer is cut into the central bore of the sleeve shaft. For example, the inverted chamfer is the inverted chamfer 46 described above. In step 108 a plurality of internal splines are cut into the central bore of the sleeve shaft such that each internal spline includes the inverted chamfer at an end portion.

In step 110 the first shaft is inserted into the central bore of the sleeve shaft. In step 112 the inner and sleeve shafts are coaxially aligned. In the example provided, the chamfers of the external splines on the first shaft ride on the inverted chamfers of the internal splines on the sleeve shaft. Accordingly, axial translation of the inner and sleeve shaft towards each other urges the inner and sleeve shafts into axial alignment.

In step 113 it is determined whether a tooth butt condition is encountered. For example, an operator may determine that there is a tooth butt condition when the inner and sleeve shafts resist axial translation with respect to each other before the shafts are fully assembled. When step 113 determines that there is a tooth butt condition, the method proceeds to step 114 wherein the shafts are rotationally aligned. For example, the operator may rotate one shaft and restrict rotation of the other shaft to rotationally align the splines. The inverted chamfer of the internal splines interacts with the traditional chamfer of the external splines along a substantially linearly shaped interface. Such an interface results in less resistance to rotation than does the full face interface between a pair of traditional chamfers in a tooth butt condition. Additionally, because the inverted chamfer contacts the traditional chamfer at a point where the inverted chamfer is at a minimum width and radially inner portion of the internal splines, the groove of the external spline and the tip of the inverted chamfer have a larger difference in width than with a pair of traditional chamfers. Therefore, the reduced width inverted chamfer fits into the larger width groove at greater variations from perfect rotational alignment than would the traditional chamfers. The operator thus expends a beneficial amount of time and effort rotationally aligning the shafts due to the inverted chamfer. When step 113 determines there is no tooth butt condition, the method proceeds to step 116.

In step 116 the shafts are axially translated to slide the internal splines and external splines into full engagement. Accordingly, the shafts are coupled for rotation and the method 100 ends.

The inverted chamfer spline provides several benefits regarding assembly of shafts. For example, the inverted chamfer is cost effective because the undercut may be rough turned into the profile of the part before a shaper cuts the spline or before it is broached. Additionally, blind assembly of two splined shafts or hubs is improved such that the splines rotationally rack together with less physical movement or operator input required relative to traditional chamfer designs. Furthermore, by inverting the chamfer, a larger spline area is available to engage with the mating splines.

The description of the invention is merely exemplary in nature and variations that do not depart from the gist of the invention are intended to be within the scope of the invention. Such variations are not to be regarded as a departure from the spirit and scope of the invention.

What is claimed is:

1. A shaft assembly comprising:
    a first shaft having a plurality of first splines, wherein the first splines each have an end portion and a chamfer disposed on the end portion; and
    a second shaft having a central axis and a central bore and being coaxial with the first shaft and having a plurality of second splines arranged in the axial direction around the periphery of the central bore, the plurality of second splines each having a base portion and an end portion, wherein the end portion defines an inverted chamfer having an undercut base and a tip, and wherein the tip of the inverted chamfer projects from the undercut base of the inverted chamfer radially away from the second shaft and axially away from the base portion of the plurality of second splines, and wherein the undercut base of the inverted chamfer undercuts the tip of the inverted chamfer, and wherein the undercut base is arranged in the axial direction around the central bore such that the undercut bores of the plurality of second splines define a circumferential groove between the tips and the central bore and wherein the plurality of first splines engage with the plurality of second splines to couple the first shaft and the second shaft for common rotation.

2. The shaft assembly of claim 1 wherein the first shaft is designed and configured to be coupled for rotation with an engine of a vehicle.

3. The shaft assembly of claim 2 wherein the first shaft is a damper hub.

4. The shaft assembly of claim 1 wherein the second shaft is a transmission input shaft.

5. The shaft assembly of claim 1 wherein the first shaft is an inner shaft and the plurality of first splines are a plurality of external splines.

6. The shaft assembly of claim 1 wherein the second shaft is a sleeve shaft that defines a central bore, and wherein the plurality of second splines are internal splines extending from the sleeve shaft into the central bore.

7. The shaft assembly of claim 1 wherein the base of the inverted chamfer is cross-sectionally semicircular in shape.

8. The shaft assembly of claim 1 wherein the plurality of second splines have a cross sectional shape that is substantially an isosceles trapezoid having a base portion at the second shaft and a tip portion radially away from the second shaft.

* * * * *